H. L. SHRIVER.
NUT LOCKING DEVICE.
APPLICATION FILED MAR. 10, 1911.
1,002,185.
Patented Aug. 29, 1911.
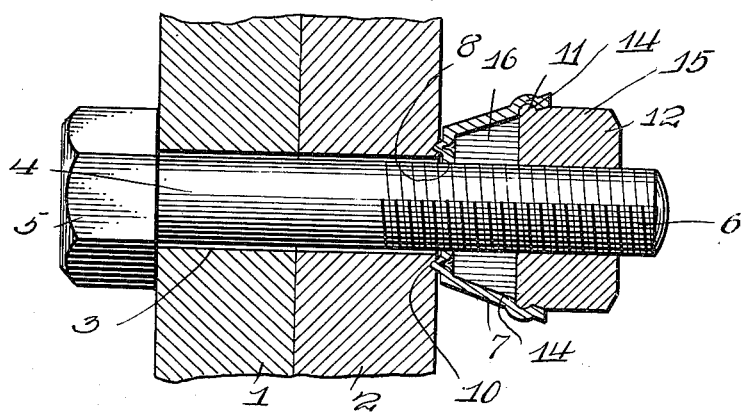
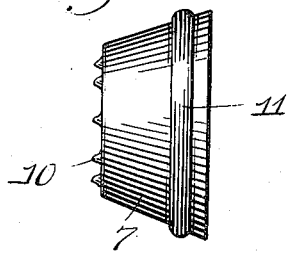
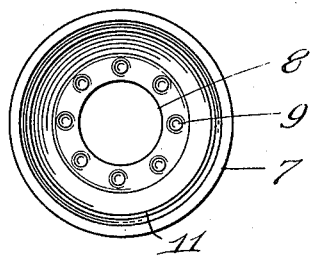
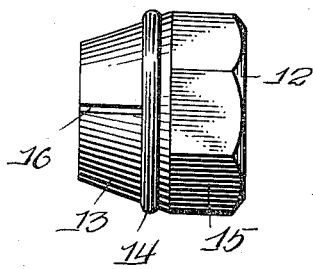
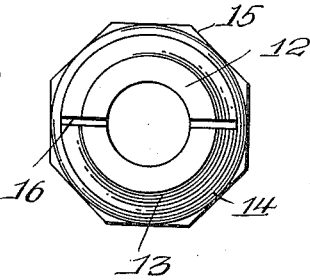
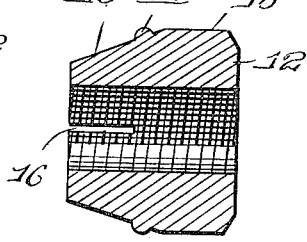
WITNESSES
Samuel Payne
K. H. Butler
INVENTOR
H. L. Shriver
by J. C. Everett Co.
Attorneys.

UNITED STATES PATENT OFFICE.

HERSCHEL L. SHRIVER, OF MORGANTOWN, WEST VIRGINIA.

NUT-LOCKING DEVICE.

1,002,185.  Specification of Letters Patent.  Patented Aug. 29, 1911.

Application filed March 10, 1911.  Serial No. 613,523.

*To all whom it may concern:*

Be it known that I, HERSCHEL L. SHRIVER, a citizen of the United States of America, residing at Morgantown, in the county of Monongalia and State of West Virginia, have invented certain new and useful Improvements in Nut-Locking Devices, of which the following is a specification, reference being had therein to the accompanying drawing.

This invention relates to nut locking devices, and the objects of my invention are to provide a nut locking device that can be used in connection with the present type of bolt for preventing a nut from becoming accidentally displaced therefrom, and to provide a nut lock that can be advantageously used in connection with rail joints, bridges, rolling stock and structures subjected to vibrations which have a tendency to loosen and displace nuts from bolts.

Further objects of the invention are to provide a nut locking device that can be easily and quickly installed without the use of skilled labor, and to accomplish the above results by a mechanical construction that is simple, free from injury by ordinary use, and highly efficient for the purposes for which it is intended.

With the above and other objects in view, the invention resides in the novel construction, combination and arrangement of parts to be hereinafter specifically described and then particularly claimed.

Reference will now be had to the drawing, wherein:—

Figure 1 is a longitudinal sectional view of the nut lock, Fig. 2 is a side elevation of the nut locking device, Fig. 3 is a front elevation of the same, Fig. 4 is a side elevation of a nut in accordance with this invention, Fig. 5 is a rear elevation of the same, and Fig. 6 is a longitudinal sectional view of the nut.

The reference numerals 1 and 2 denote, by the way of an example, two pieces of material having transverse registering openings 3 for a bolt 4 having a head 5 at one end thereof engaging the outer side of the piece of material 1, and an exteriorly threaded end 6 protruding from the outer side of the piece of material 2.

7 denotes a cup-shaped metallic locking device having the small end thereof provided with an opening 8 for the threaded end 6 of the bolt 4, and the material surrounding said opening is provided with a plurality of circumferentially arranged indentations 9 forming teats 10 adapted to engage in the piece of material 2 around the opening 3 thereof, said teats holding the nut locking device in a fixed position relatively to the piece of material 2. The tapering walls of the nut locking device 7, adjacent to the edges thereof, are provided with an annular groove 11 forming by reaming or forcing outwardly the walls of the locking device to form an annular bead upon the outer sides of said device.

12 denotes a hexagonal, octagonal or rectangular nut adapted to screw upon the threaded end 6 of the bolt 4, said nut having the inner face thereof provided with a tapering split extension 13 and with an annular bead or rib 14. The bead or rib 14 is arranged adjacent to the rear edge of the facets 15 of the nut 12, and the tapering end of the nut is provided with diametrically opposed longitudinal slots 16 whereby as the nut is screwed upon the bolt 4, the tapering end thereof will be contracted within the nut locking device to frictionally grip the threads of the bolt until the bead or rib 14 engages in the annular groove 11 of the nut locking device. Then it will be impossible for the nut 12 to rotate upon the bolt 4, as the nut locking device is firmly held in engagement with the piece of material 2 through the medium of the teats 10.

From the foregoing it will be observed that I have devised positive and reliable means for retaining the nut 12 upon the bolt 4, and as the nut locking device can be stamped and pressed from light and durable resilient metal, it is obvious that the same can be manufactured at a comparatively small cost.

What I claim is:—

1. In a nut locking device, a bolt, a cup-shaped nut locking device mounted upon said bolt, teats carried by said device and adapted to engage the underlying structure, said device adjacent to the outer edges thereof having an annular groove, a nut adapted to screw upon said bolt, said nut having a tapering split end adapted to enter and be compressed upon the bolt by said device, and an annular bead carried by said nut and adapted to engage in the groove of said device for maintaining the nut in position.

2. The combination with a bolt, of a cup-shaped nut locking device mounted upon said bolt, teats carried by the small end of said device and adapted to hold said device fixed relatively to the underlying structure, a nut screwed upon said bolt and having a tapering split end adapted to enter and be compressed upon the bolt by said device, and an annular bead carried by said nut and adapted to enter said device and engage in the side walls thereof, for maintaining the nut in position substantially as described.

3. The combination with a bolt, of a tapering nut locking device mounted upon said bolt, teats carried by said nut locking device and adapted to fix said nut locking device relatively to the underlying structure, said device having an annular groove formed therein, a nut screwed upon said bolt and having a split tapering end adapted to extend into and engaged by the inner face of said device whereby the tapering end of the nut is contracted to frictionally engage the threads of said bolt, and an annular bead carried by said nut and adapted to engage in the groove of said nut locking device, for maintaining the nut in position substantially as, and for the purpose herein described.

In testimony whereof I affix my signature in the presence of two witnesses.

HERSCHEL L. SHRIVER.

Witnesses:
S. F. GLASSCOCK,
FRANK L. BOWMAN.